United States Patent
Li

(10) Patent No.: US 11,976,143 B2
(45) Date of Patent: May 7, 2024

(54) AEROGEL-MODIFIED POLYPROPYLENE, AND ULTRALIGHT THERMAL-INSULATING MELT-BLOWN NON-WOVEN FABRIC AND PREPARATION METHOD THEREOF

(71) Applicant: BEIJING HONG WARM FIBRES TECHNOLOGY CO., LTD., Beijing (CN)

(72) Inventor: Guangwu Li, Beijing (CN)

(73) Assignee: BEIJING HONG WARM FIBRES TECHNOLOGY CO., LTD., Beijing (CN)

( * ) Notice: Subject to any disclaimer, the term of this patent is extended or adjusted under 35 U.S.C. 154(b) by 864 days.

(21) Appl. No.: 17/043,660

(22) PCT Filed: Apr. 11, 2019

(86) PCT No.: PCT/CN2019/082204
§ 371 (c)(1),
(2) Date: Sep. 30, 2020

(87) PCT Pub. No.: WO2019/205947
PCT Pub. Date: Oct. 31, 2019

(65) Prior Publication Data
US 2021/0040248 A1    Feb. 11, 2021

(30) Foreign Application Priority Data
Apr. 24, 2018   (CN) ............................ 201810377101

(51) Int. Cl.
| *C08F 110/06* | (2006.01) |
| *D04H 1/4291* | (2012.01) |
| *D04H 1/54* | (2012.01) |
| *D04H 3/007* | (2012.01) |
| *D04H 3/14* | (2012.01) |

(52) U.S. Cl.
CPC .......... *C08F 110/06* (2013.01); *D04H 1/4291* (2013.01); *D04H 1/54* (2013.01); *D04H 3/007* (2013.01); *D04H 3/14* (2013.01)

(58) Field of Classification Search
CPC ....... C08F 110/06; D04H 1/4291; D04H 1/54; D04H 3/14; D04H 3/007
USPC .............................................. 526/357
See application file for complete search history.

(56) References Cited

U.S. PATENT DOCUMENTS 5,366,792 A * 11/1994 Shirayanagi ............ B32B 5/022
428/196
2007/0014979 A1 * 1/2007 Bullock ................... B32B 5/245
428/292.1

FOREIGN PATENT DOCUMENTS

| CN | 101511879 A | 8/2009 | |
| CN | 101568555 A | 10/2009 | |
| CN | 101665993 A | 3/2010 | |
| CN | 102300537 A | 12/2011 | |
| CN | 103388193 A | 11/2013 | |
| CN | 105209248 A | 12/2015 | |
| CN | 105862157 A | 8/2016 | |
| CN | 106319662 A * | 1/2017 | ............... D01F 1/10 |
| CN | 106319662 A | 1/2017 | |
| CN | 107685457 A | 2/2018 | |
| CN | 107849764 A | 3/2018 | |
| CN | 108677380 A | 10/2018 | |
| KR | 20100057103 A | 5/2010 | |
| KR | 2010011684 A | 11/2010 | |
| KR | 20130130271 A | 12/2013 | |
| WO | 2017087511 A1 | 5/2017 | |

* cited by examiner

Primary Examiner — Michael M. Bernshteyn
(74) Attorney, Agent, or Firm — Samson G. Yu

(57) ABSTRACT

The disclosure discloses an aerogel-modified polypropylene and a preparation method thereof, and ultralight thermal-insulating melt-blown non-woven fabric containing the aerogel-modified polypropylene and a preparation method thereof. The preparation method for the aerogel-modified polypropylene includes the following steps: before or during a polymerization reaction, adding aerogel to blend with reaction materials with low viscosities. thereby implementing uniform dispersion of the aerogel to prepare the aerogel-modified polypropylene; herein the reaction materials include a propylene monomer, a catalyst, and an additive, and the aerogel has a granularity falling within a range from 20 nm to 100 μm, a porosity falling within a range from 40% to 99.9%, a stacking density falling within a range from to 500 g/L, and, a volume fraction being 20-60% of a volume of the ultralight thermal-insulating melt-blown non-woven fabric prepared from the aerogel-modified polypropylene.

20 Claims, No Drawings

AEROGEL-MODIFIED POLYPROPYLENE, AND ULTRALIGHT THERMAL-INSULATING MELT-BLOWN NON-WOVEN FABRIC AND PREPARATION METHOD THEREOF

CROSS-REFERENCE TO RELATED PATENT APPLICATIONS

The present application is a National Stage of international Patent Application No. PCT/CN2019/082204, filed on Apr. 11, 2019, and claims the priority of Chinese Patent Application No. 201810377101.9_ filed on Apr. 11, 2019 the disclosures of which are incorporated herein by reference in their entirety.

TECHNICAL FIELD

The disclosure relates to the field of non-woven fabric materials, and in particular to an aerogel-modified polypropylene, ultralight thermal-insulating melt-blown non-woven fabric and a preparation method thereof.

BACKGROUND

Non-woven fabric is a type of fabric which is formed without being spun and woven, but only formed by enabling weaving short fibers or filaments to be oriented or randomly arranged to form a web structure, and then reinforcing by using mechanical methods, thermal bonding or chemical methods.

At present, there are various processes for preparing the non-woven fabric, for example, in a paper of "silica aerogel/polypropylene melt-blown nonwoven material preparation and performance research", a method for preparing the aerogel modified polypropylene melt-blown non-woven fabric by melt blending of the polypropylene and the aerogel is provided. In CN 104446333 A, PP (polypropylene) fibers are silanized by APTES (3-aminopropyltriethoxysilane) and then immersed in TEOS (ethyl orthosilicate) solution, the non-woven fabric with a thin layer of $SiO_2$ aerogel is generated through a co-hydrolysis and co-cross-linked gel reaction, and then it is subjected to multiple cross-impregnation, and the co-hydrolysis and co-cross-linked gel reactions, a PP fiber-reinforced $SiO_2$ gel material is obtained by drying. CN 106838547 A provides a powder-free thermal-insulating felt (board) containing a nanoporous thermal-insulating material and a preparation method thereof. In this technology, conventional needle punching technology or cotton carding technology is used to make fibers into a fiber matrix material of a sheet-like or roll-shaped felt, and then an adhesive is dipped or sprayed on the fiber surface of the matrix material, finally the grinded nanoporous thermal-insulating material is sprayed to the fibers to obtain the thermal-insulating felt (board) bonded with the nanoporous material.

However, the above methods all have certain technical problems, for example: in the paper of "silica aerogel/polypropylene melt-blown nonwoven material preparation and performance research", the aerogel-modified PP melt-blown non-woven fabric is prepared by using the melt blending method, due to a large difference in stacking density between the PP and the aerogel, it is difficult to obtain the non-woven fabric with uniform aerogel dispersion and adjustable particle size in a melt-blown device with a limited melting range. In CN 104446333 A, it is necessary to perform surface silanization treatment on the PP fibers, and then it is subjected to multiple immersion in the TEOS solution, and the co-hydrolysis and co-cross-linked gel reaction is performed, not only the process is cumbersome and time-consuming, but also the PP fibers need to be chemically modified. It is easy to reduce the mechanical properties of the PP fibers and reduce the mechanical properties of a final product; in addition, the $SiO_2$ dry gel that is not in direct contact with the surface of the PP fibers is very easy to fall off during a using process, the service life of the material is reduced, the use environment is worsen, and body health of a user is endangered. In GN 106838547 A, a three-layer composite method of fiber layer, bonding layer and nanoporous thermal-insulating layer is used to prepare a dust-proof thermal-insulating felt (board), a process is more complicated, the content of the nanoporous thermal-insulating material in the thermal-insulating felt (board) and the depth into the fiber matrix are greatly affected by a size of pores between the fibers in the fiber matrix; in addition, this technology uses a spraying method to add the nanoporous thermal-insulating material, herein the fiber matrix is equivalent to a filtering material, it is easy to block the nanoporous thermal-insulating material on the outer surface of the matrix, and it is difficult to achieve the uniform dispersion effect of the nanoporous thermal-insulating material, and the adhesive layer on the thermal-insulating felt (board) is easy to bond with foreign matters such as dust during the using process, performances thereof, such as appearance and air permeability, are affected.

SUMMARY

The disclosure aims to provide an aerogel-modified polypropylene, ultralight thermal-insulating melt-blown non-woven fabric and a preparation method thereof, as to solve technical problems of aerogel-modified non-woven fabric prepared by a melt-blown method in an existing technology that a dispersion uniformity of aerogel is poor, a granularity is uncontrollable, and the aerogel is easy to fall in a using process.

In order to achieve the above purpose, one aspect of the disclosure provides a preparation method for an aerogel-modified polypropylene. The preparation method includes the following steps: before or during a polymerization reaction, adding aerogel to blend with reaction materials with low viscosities, thereby implementing uniform dispersion of the aerogel to prepare the aerogel-modified polypropylene through a propylene polymerization process; herein the reaction materials include a propylene monomer, a catalyst, and an additive, and the aerogel has a granularity falling within a range from 20 nm to 100 μm, a porosity falling within a range from 40% to 99.9%, a stacking density falling within a range from 3 to 500 g/L, and a volume fraction being 20-60% of a volume of the ultralight thermal-insulating melt-blown non-woven fabric prepared from the aerogel-modified polypropylene.

Further, the propylene polymerization process is a gas-phase method propylene polymerization process, a slurry method propylene polymerization process or a liquid-phase method propylene polymerization process.

Further, in the gas-phase method propylene polymerization process, the step of adding the aerogel to blend with the reaction materials with low viscosities includes enabling the aerogel to blend with a propylene monomer, or blending with the catalyst, or separately adding to a polymerization reaction device to blend with the reaction materials, or arbitrary combinations of the above blending modes.

Further, in the slurry method propylene polymerization process, the step of adding the aerogel to blend with the reaction materials with low viscosities includes enabling the aerogel to blend with slurry-like liquid formed by the catalyst and a hydrocarbon solvent, or blending with the propylene monomer, or separately adding to the polymerization reaction device to blend with the reaction materials, or arbitrary combinations of the above blending modes.

Further, the slurry method propylene polymerization process further includes the following steps: enabling an obtained polypropylene raw material to be subjected to deashing, sedimentation and separation of a solvent and a random substance, and mixing.

Further, in the liquid-phase method propylene polymerization process, the step of adding the aerogel to blend with the reaction materials with low viscosities includes enabling the aerogel to blend with the propylene monomer, or blending with the catalyst, or separately adding to the polymerization reaction device to blend with the reaction materials, or arbitrary combinations of the above blending modes.

Further, the liquid-phase method propylene polymerization process includes flash-separating and removing a random copolymer.

Another aspect, of the disclosure provides a preparation method for ultralight thermal-insulating melt-blown non-woven fabric. The preparation method includes the following steps: preparing an aerogel-modified polypropylene by using any one of the above methods; and enabling the aerogel-modified polypropylene to enter a melt-blown device to prepare the ultralight thermal-insulating melt-blown non-woven fabric.

According to yet another aspect of the disclosure, an aerogel-modified polypropylene is provided, and obtained by using any one of the above preparation methods for the aerogel-modified polypropylene, a size of aerogel in the aerogel-modified polypropylene is 15 nm to 100 μm.

According to still another aspect of the disclosure, ultralight thermal-insulating melt-blown non-woven fabric is provided, and obtained by using the above preparation method for the ultralight thermal-insulating melt-blown non-woven fabric, herein, a size of aerogel in the ultralight thermal-insulating melt-blown non-woven fabric is 15 nm to 10 μm.

A technical scheme of the disclosure is applied, in the case without adding any dispersing additives, through selecting the aerogel with the different particle sizes and porosities, changing an addition amount of the aerogel, and improving the blending mode, aerogel-modified polypropylene particles with uniform aerogel dispersion and good melt-blown performance and melt-blown polypropylene non-woven fabric with an ultralight thermal-insulating function are prepared, and the aerogel in the non-woven fabric does not fall off during the using process, and service life is long.

DETAILED DESCRIPTION OF THE EMBODIMENTS

It is to be noted that embodiments in the present application and features in the embodiments may be combined with each other in the case without conflicting. The disclosure is described in detail below in combination with the embodiments.

In order to solve technical problems of aerogel-modified non-woven fabric prepared by a melt-blown method in an existing technology that a dispersion uniformity of aerogel is poor, a granularity is uncontrollable, and the aerogel is easy to fall in a using process and the like, based on an in-situ polymerization method, the disclosure provides aerogel-modified melt-blown PP (polypropylene) non-woven fabric with a good thermal-insulating function which is melt-blown and obtained by using a propylene monomer as a raw material, through limiting characteristic parameters (a particle size, a porosity, and a stacking density (3-500 g/L) [stacking density: a mass per unit volume in a natural state of accumulation, the mass per unit volume including internal and external pores of particles and intergranular pores] and the like) of the specific aerogel, an aerogel addition amount and a blending method to prepare the modified polypropylene with an adjustable aerogel statistical size, uniform dispersion and good melt-blown performance. The disclosure is also capable of effectively avoiding problems in a technology for preparing an aerogel felt (board) by a filter filling method that the aerogel is easy to fall off, service life is short, the use environment is worsen, body health of a user is endangered and the like.

According to a typical implementation mode of the disclosure, a preparation method for an aerogel-modified polypropylene is provided. The preparation method includes the following steps: before or during a polymerization reaction, adding aerogel to blend with reaction materials with low viscosities, thereby implementing uniform dispersion of the aerogel to prepare the aerogel-modified polypropylene through a propylene polymerization process; herein the reaction materials include a propylene monomer, a catalyst, and an additive, and the aerogel has a granularity falling within a range from 20 nm to 100 μm, a porosity falling within a range from 40% to 99.9%, a stacking density falling within a range from 3 to 500 g/L, and a volume fraction being 20-60% of a volume of the ultralight thermal-insulating melt-blown non-woven fabric prepared from the aerogel-modified polypropylene.

In the disclosure, the catalyst may be a Ziegler-Natta catalyst system or a metallocene catalyst system, a dosage is 30~0.8 kg.pp/g.cat (0.1~5 ppm); and the additive may be hydrogen, a dosage is 50~1000 ppm.

A technical solution of the disclosure is applied, in the case without adding any dispersing additives, through selecting the aerogel with the different particle sizes and porosities, changing an addition amount of the aerogel, and improving the blending mode, aerogel-modified polypropylene particles with uniform aerogel dispersion and good melt-blown performance and melt-blown polypropylene non-woven fabric with an ultralight thermal-insulating function are prepared, in addition, because the in-situ polymerization method is used to obtain the aerogel-modified polypropylene, this preparation method may obtain a polymer with uniform powder dispersion and adjustable granularity, due to a surface tension subjected to polypropylene melt during processing and a runner shear force effect, the aerogel is wrapped in a polypropylene matrix, the aerogel in the non-woven fabric does not fall off in the using process, and the service life is long.

According to a typical implementation mode of the disclosure, the propylene polymerization process is a gas-phase method propylene polymerization process, a slurry method propylene polymerization process or a liquid-phase method propylene polymerization process.

According to a typical implementation mode of the disclosure, in the gas-phase method propylene polymerization process, the step of adding the aerogel to blend with the reaction materials with low viscosities includes enabling the aerogel to blend with a propylene monomer, or blending with the catalyst, or separately adding to a polymerization reaction device to blend with the reaction materials, or arbitrary combinations of the above blending modes.

According to a typical implementation mode of the disclosure, in the slurry method propylene polymerization process, the step of adding the aerogel to blend with the reaction materials with low viscosities includes enabling the aerogel to blend with slurry-like liquid formed by the catalyst and a hydrocarbon solvent, or blending with the propylene monomer, or separately adding to the polymerization reaction device to blend with the reaction materials, or arbitrary combinations of the above blending modes.

Preferably, the slurry method propylene polymerization process further includes the following steps: enabling an obtained polypropylene raw material to be subjected to deashing, sedimentation and separation of a solvent and a random substance, and mixing.

According to a typical implementation mode of the disclosure, in the liquid-phase method propylene polymerization process, the step of adding the aerogel to blend with the reaction materials with low viscosities includes enabling the aerogel to blend with the propylene monomer, or blending with the catalyst, or separately adding to the polymerization reaction device to blend with the reaction materials, or arbitrary combinations of the above blending modes.

Preferably, the liquid-phase method propylene polymerization process includes flash-separating and removing a random copolymer.

According to a typical implementation mode of the disclosure, a preparation method for ultralight thermal-insulating melt-blown non-woven fabric is provided. The preparation method includes the following steps: preparing an aerogel-modified polypropylene by using any one of the above methods; and enabling the aerogel-modified polypropylene to enter a melt-blown device to prepare the ultralight thermal-insulating melt-blown non-woven fabric.

According to a typical implementation mode of the disclosure, an aerogel-modified polypropylene is provided. The aerogel-modified polypropylene is obtained by using any one of the above preparation methods, and a size of aerogel in the aerogel-modified polypropylene is 15 nm to 100 μm.

According to a typical implementation mode of the disclosure, ultralight thermal-insulating melt-blown non-woven fabric is provided. The ultralight thermal-insulating melt-blown non-woven fabric is obtained by using the above preparation method, herein, a size of aerogel in the ultralight thermal-insulating melt-blown non-woven fabric is 15 nm to 10 μm. The non-woven fabric has the advantages of light weight, good thermal-insulating effect and the like.

Beneficial effects of the disclosure are further illustrated below in combination with embodiments, steps or raw materials which are not described in detail in the following embodiments may be achieved by using conventional technical means or conventional raw materials in the present field.

Embodiment 1

Gas-Phase Method:

Aerogel is dehydrated and dried by a method of heating and drying or a dehydrating agent; and the dehydrated aerogel is deoxidized by an inert gas or a deoxidizing agent to obtain a dry and deoxidized aerogel.

Catalyst ultrahigh activity $TiCl_3$/diisobutyldimethoxysilane/$MgCl_2$/$Et_3Al$ (a mass ratio is 25:55:21:53, and $TiCl_3$ is 8 ppm), a refined propylene monomer, hydrogen (150 ppm) and dehydrated and deoxygenated aerogel (2 wt % of propylene) are successively added to a first horizontal stirring bed reactor, stirring is started, and a temperature is risen to 71 DEG C. and a pressure is 2.25 MPa. Obtained polypropylene powder is sent to a second horizontal stirring bed reactor by a powder conveying fan, and at the same time, the refined propylene monomer and the hydrogen are added to the second horizontal stirring bed reactor, the stirring is started, and the temperature is risen to 71 DEG C., the pressure is 2.25 MPa. After a polymerization reaction, the polypropylene powder is separated from a gas in a bag filter, dried and deactivated in a degassing bin, and enters an extrusion granulation system for mixing and pelletizing.

The above polypropylene is tested according to a GB/T 30923-2014 plastic polypropylene (PP) melt-blown special material, and a melt index is 715 g/min.

The above polypropylene particles are melt-blown under a conventional polypropylene melt-blown device and process parameters to obtain aerogel-containing melt-blown polypropylene non-woven fabric with a thermal conductivity of 0.029 W/(m·K), herein, a volume fraction of aerogel in the final ultra-light thermal-insulating melt-blown non-woven fabric is 56%. The specific melt-blown parameters are as follows: a die temperature is 245 DEG C., a distance from die to catcher is 0.152 m, a hot air temperature is 145 DEG C., and a hot air speed is 500 m/s.

Embodiment 2

Liquid-Phase Method:

As in Embodiment 1, aerogel is subjected to drying and deoxidizing pretreatment.

3000 kg of a refined propylene monomer is added into a 12 $m^3$ of a polymerizer, the dehydrated and deoxidized aerogel is added from a feed port to the polymerizer, stirring is started, and then catalyst $TiCl_3$/$AlEt_2Cl$/Lewis alkali ($TiCl_3$ is 50 ppm, an aluminum/titanium molar ratio is 11, a Lewis alkali/titanium molar ratio is 3), and hydrogen (150 ppm) are added, a temperature is raised to 75 DEG C., a pressure is 3.5 MPa, and polymerization is started. A reaction is stopped when a conversion rate of the polymerization reaches 70% to 80%, the unreacted propylene monomer is discharged, the polypropylene is discharged to a flash tank for flash vaporization, and air is fed, polypropylene powder is obtained by discharging, and polypropylene particles are obtained by extruding and pelletizing.

The above polypropylene is tested according to a GB/T 30923-2014 plastic polypropylene (PP) melt-blown special material, and a melt index is 898 g/10 min.

The above polypropylene particles are melt-blown under a conventional polypropylene melt-blown device and process parameters to obtain aerogel-containing melt-blown polypropylene non-woven fabric with a thermal conductivity of 0.031 W/(m·k), herein, a volume fraction of aerogel, in the final ultra-light thermal-insulating melt-blown non-woven fabric is 49%. The specific melt-blown parameters are as follows: a die temperature is 240 DEG C., a distance from die to catcher is 0.152 m, a hot air temperature is 140 DEG C., and a hot air speed is 400 m/s.

Embodiment 3

Slurry Method:

As in Embodiment 1, aerogel is subjected to drying and deoxidizing pretreatment.

Catalyst $TiCl_3$/$AlEt_2Cl$/Lewis alkali ($TiCl_3$ is 50 ppm, an aluminum/titanium molar ratio is 11, and a Lewis alkali/titanium molar ratio is 3), and hydrogen (150 ppm) are added to a prepolymerization reactor, and mixed with an inert solvent hexane into a slurry state, a quantitative gaseous refined propylene is added under a nitrogen sealing condition, and polymerized at a temperature of 10-25 DEG C. for 1 to 2 hours to obtain a prepolymerized catalyst.

The prepolymerized catalyst and dehydrated and deoxygenated aerogel are added to the liquid refined propylene, stirring is started, a temperature is risen to 70 DEG C., and a pressure is 1.0 MPa, and polymerization is started. A reaction is stopped when a conversion rate of the polymerization reaches 70%-80%, the unreacted propylene monomer is discharged, and the polypropylene is discharged to a flash tank for flash evaporation, after that, air is fed, after washing, centrifugal separation and drying, the polypropylene powder is obtained by discharging, and polypropylene particles are obtained by extruding and pelletizing.

The above polypropylene is tested according to a GB/T 30923-2014 plastic polypropylene (PP) melt-blown special material, and a melt index is 912 g/10 min.

The above polypropylene particles are melt-blown under a conventional polypropylene melt-blown device and process parameters to obtain aerogel-containing melt-blown polypropylene non-woven fabric with a thermal conductivity of 0.035 W/(m·K), herein, a volume fraction of aerogel in the final ultra-light thermal-insulating melt-blown non-woven fabric is 40%. The specific melt-blown parameters are as follows: a die temperature is 240 DEG C., a distance from die to catcher is 0.152 m, a hot air temperature is 140 DEG C., and a hot air speed is 400 m/s.

Embodiment 4

Slurry Method:

As in Embodiment 1, aerogel is subjected to drying and deoxidizing pretreatment.

Dehydrated and deoxygenated aerogel, catalyst $TiCl_3$/$AlEt_2Cl$/Lewis alkali ($TiCl_3$ is 50 ppm, an aluminum/titanium molar ratio is 11, and a Lewis alkali/titanium molar ratio is 3), and hydrogen (150 ppm) are added to a prepolymerization reactor, and mixed with an inert solvent hexane into a slurry state, a quantitative gaseous refined propylene is added under a nitrogen sealing condition, and polymerized at a temperature of 10-25 DEG C. for 1 to 2 hours to obtain a prepolymerized catalyst.

The above prepolymerized catalyst is added to the liquid refined propylene, stirring is started, a temperature is risen to 70 DEG C., and a pressure is 1.0 MPa, and polymerization is started. A reaction is stopped when a conversion rate of the polymerization reaches 70%-80%, the unreacted propylene monomer is discharged, and the polypropylene is discharged to a flash tank for flash evaporation, after that, air is fed, after washing, centrifugal separation and drying, the polypropylene powder is obtained by discharging, and polypropylene particles are obtained by extruding and pelletizing.

The above polypropylene is tested according to a GB/T 30923-2014 plastic polypropylene (PP) melt-blown special material, and a melt index is 804 g/10 min.

The above polypropylene particles are melt-blown under a conventional polypropylene melt-blown device and process parameters to obtain aerogel-containing melt-blown polypropylene non-woven fabric with a thermal conductivity of 0.00 W/(m·K), herein, a volume fraction of aerogel in the final ultra-light thermal-insulating melt-blown nonwoven fabric is 52%. The specific melt-blown parameters are as follows: a die temperature is 245 DEG C., a distance from die to catcher is 0.152 m, a hot air temperature is 145 DEG C., and a hot air speed is 500 m/s.

Embodiment 5

Gas-Phase Method:

Aerogel is dehydrated and dried by a method of heating and drying or a dehydrating agent; and the dehydrated aerogel is deoxidized by an inert gas or a deoxidizing agent to obtain a dry and deoxidized aerogel.

Catalyst ultrahigh activity $TiCl_3$/diisobutyldimethoxysilane/$MgCl_2$/$Et_3Al$ (a mass ratio is 25:55:21:53, and $TiCl_3$ is 8 ppm), a refined propylene monomer, and hydrogen (150 ppm) are successively added to a first horizontal stirring bed reactor, stirring is started, and a temperature is risen to 71 DEG C. and a pressure is 2.25 MPa. Obtained polypropylene powder is sent to a second horizontal stirring bed reactor by a powder conveying fan, and at the same time, the dehydrated and deoxygenated aerogel (0.8 wt % of the propylene in the first horizontal stirring bed reactor), the refined propylene monomer and the hydrogen are added to the second horizontal stirring bed reactor, the stirring is started, and the temperature is risen to 71 DEG C., the pressure is 2.25 MPa. After a polymerization reaction, the polypropylene powder is separated from a gas in a bag filter, dried and deactivated in a degassing bin, and enters an extrusion granulation system for mixing and pelletizing.

The above polypropylene is tested, according to a GB/T 30923-2014 plastic polypropylene (PP) melt-blown special material, and a melt index is 120600 min.

The above polypropylene particles are melt-blown under a conventional polypropylene melt-blown device and process parameters to obtain aerogel-containing melt-blown polypropylene non-woven fabric with a thermal conductivity of 0.058 W/(m·K), herein, a volume fraction of aerogel in the final ultra-light thermal-insulating melt-blown non-woven fabric is 23%. The specific melt-blown parameters are as follows: a die temperature is 245 DEG C., a distance from die to catcher is 0.152 m, a hot air temperature is 145 DEG C., and a hot air speed is 500 m/s.

Contrast Example 1

Slurry Method:

As in Embodiment 1, aerogel is subjected to drying and deoxidizing pretreatment.

Catalyst $TiCl_3$/$AlEt_2Cl$/Lewis alkali ($TiCl_3$ is 50 ppm, an aluminum/titanium molar ratio is 11, and a Lewis alkali/titanium molar ratio is 3), and hydrogen (150 ppm) are added to a prepolymerization reactor, and mixed with an inert solvent hexane into a slurry state, a quantitative gaseous refined propylene is added under a nitrogen sealing condition, and polymerized at a temperature of 10-25 DEG C. for 1 to 2 hours to obtain a prepolymerized catalyst.

The prepolymerized catalyst and dehydrated and deoxygenated aerogel are added to the liquid refined propylene, stirring is started, a temperature is risen to 70 DEG C., and a pressure is 1.0 MPa, and polymerization is started. A reaction is stopped when a conversion rate of the polymerization reaches 70%-80%, the unreacted propylene monomer is discharged, and the polypropylene is discharged to a flash tank for flash evaporation, after that, air is fed, after washing, centrifugal separation and drying, the polypropylene powder is obtained by discharging, and polypropylene particles are obtained by extruding and pelletizing.

The above polypropylene is tested according to a GB/T 30923-2014 plastic polypropylene (PP) melt-blown special material, and a melt index is 1327 g/10 min.

The above polypropylene particles are melt-blown under a conventional polypropylene melt-blown device and process parameters to obtain aerogel-containing melt-blown polypropylene non-woven fabric with a thermal conductivity of 0.084 W/(m·K), herein, a volume fraction of aerogel in the final ultra-light thermal-insulating melt-blown non-woven fabric is 10%. The specific melt-blown parameters are as follows: a die temperature is 240 DEG C., a distance from die to catcher is 0.152 m, a hot air temperature is 140 DEG C., and a hot air speed is 400 m/s.

From the above description, it may be observed that the above embodiments of the disclosure achieve the following technical effects.

1) A simple and efficient aerogel blending mode is provided to obtain aerogel-modified PP with good melt-blown performance, and ultralight thermal-insulating PP melt-blown nonwoven fabric.

2) The control of particle size and dispersibility of the aerogel in the polypropylene, and the melt-blown nonwoven fabric thereof is achieved.

The above are only preferable embodiments of the disclosure, and are not intended to limit the disclosure. Various modifications and changes may be made to the disclosure by those skilled in the art. Any modifications, equivalent replacements, improvements and the like made within spirit and principle of the disclosure should be included in a scope of protection of the disclosure.

What is claimed is:

1. A preparation method for an aerogel-modified polypropylene, wherein the preparation method comprises the following steps:
    before or during a in-situ polymerization reaction, adding aerogel to blend with reaction materials, thereby implementing uniform dispersion of the aerogel to prepare the aerogel-modified polypropylene through a propylene polymerization process;
    wherein the reaction materials comprises a propylene monomer, a catalyst, and an additive, without adding any dispersing additives, and the aerogel has a grain size falling within a range from 20 nm to 100 µm, a porosity falling within a range from 40% to 99.9%, a stacking density falling within a range from 3 to 500 g/L, and a volume fraction being 20-60% of a volume of the ultralight thermal-insulating melt-blown non-woven fabric prepared from the aerogel-modified polypropylene.

2. The preparation method as claimed in claim 1, wherein the propylene polymerization process is a gas-phase method propylene polymerization process, a slurry method propylene polymerization process or a liquid-phase method propylene polymerization process.

3. The preparation method as claimed in claim 2, wherein in the gas-phase method propylene polymerization process, the step of adding the aerogel to blend with the reaction materials comprises enabling the aerogel to blend with a propylene monomer, or blending with the catalyst, or separately adding to a polymerization reaction device to blend with the reaction materials, or arbitrary combinations of the above blending modes.

4. The preparation method as claimed in claim 2, wherein in the slurry method propylene polymerization process, the step of adding the aerogel to blend with the reaction materials with low viscosities comprises enabling the aerogel to blend with slurry-like liquid formed by the catalyst and a hydrocarbon solvent, or blending with the propylene monomer, or separately adding to the polymerization reaction device to blend with the reaction materials, or arbitrary combinations of the above blending modes.

5. The preparation method as claimed in claim 4, wherein the slurry method propylene polymerization process further comprises the following steps: enabling an obtained polypropylene raw material to be subjected to deashing, sedimentation and separation of a solvent and a random substance, and mixing.

6. The preparation method as claimed in claim 2, wherein in the liquid-phase method propylene polymerization process, the step of adding the aerogel to blend with the reaction materials comprises enabling the aerogel to blend with the propylene monomer, or blending with the catalyst, or separately adding to the polymerization reaction device to blend with the reaction materials, or arbitrary combinations of the above blending modes.

7. The preparation method as claimed in claim 6, wherein the liquid-phase method propylene polymerization process comprises flash-separating and removing a random copolymer.

8. A preparation method for ultralight thermal-insulating melt-blown non-woven fabric, wherein the preparation method comprises the following steps:
    preparing an aerogel-modified polypropylene by using the preparation method as claimed in claim 1; and
    enabling the aerogel-modified polypropylene to enter a melt-blown device to prepare the ultralight thermal-insulating melt-blown non-woven fabric.

9. An aerogel-modified polypropylene, wherein the aerogel-modified polypropylene is prepared by using the preparation method as claimed in claim 1, and a size of aerogel in the aerogel-modified polypropylene is 15 nm to 100 µm.

10. An ultralight thermal-insulating melt-blown non-woven fabric, wherein the ultralight thermal-insulating melt-blown non-woven fabric is prepared by using the preparation method as claimed in claim 8, and a size of aerogel in the ultralight thermal-insulating melt-blown non-woven fabric is 15 nm to 10 µm.

11. The preparation method as claimed in claim 8, wherein preparing an aerogel-modified polypropylene by using the preparation method as claimed in claim 2.

12. The preparation method as claimed in claim 11, wherein preparing an aerogel-modified polypropylene by using the preparation method as claimed in claim 3.

13. The preparation method as claimed in claim 11, wherein preparing an aerogel-modified polypropylene by using the preparation method as claimed in claim 4.

14. The preparation method as claimed in claim 13, wherein preparing an aerogel-modified polypropylene by using the preparation method as claimed in claim 5.

15. The preparation method as claimed in claim 11, wherein preparing an aerogel-modified polypropylene by using the preparation method as claimed in claim 6.

16. The preparation method as claimed in claim 15, wherein preparing an aerogel-modified polypropylene by using the preparation method as claimed in claim 7.

17. The aerogel-modified polypropylene as claimed in claim 9, wherein the aerogel-modified polypropylene is prepared by using the preparation method as claimed in claim 2.

18. The aerogel-modified polypropylene as claimed in claim 17, wherein the aerogel-modified polypropylene is prepared by using the preparation method as claimed in claim 3.

19. The aerogel-modified polypropylene as claimed in claim 17, wherein the aerogel-modified polypropylene is prepared by using the preparation method as claimed in claim 4.

20. The aerogel-modified polypropylene as claimed in claim 19, wherein the aerogel-modified polypropylene is prepared by using the preparation method as claimed in claim 5.

* * * * *